United States Patent
Belcastro

(10) Patent No.: US 12,520,972 B2
(45) Date of Patent: Jan. 13, 2026

(54) CUTTING BOARD ASSEMBLY WITH SCRAP MOVER

(71) Applicant: Domenic Belcastro, Shelby Township, MI (US)

(72) Inventor: Domenic Belcastro, Shelby Township, MI (US)

( * ) Notice: Subject to any disclaimer, the term of this patent is extended or adjusted under 35 U.S.C. 154(b) by 322 days.

(21) Appl. No.: 18/214,950

(22) Filed: Jun. 27, 2023

(65) Prior Publication Data

US 2024/0315490 A1    Sep. 26, 2024

Related U.S. Application Data

(60) Provisional application No. 63/454,269, filed on Mar. 23, 2023.

(51) Int. Cl.
*A47J 47/00*    (2006.01)

(52) U.S. Cl.
CPC .................... *A47J 47/005* (2013.01)

(58) Field of Classification Search
CPC ....... A47J 47/00; A47J 47/005; B30B 9/3053; B30B 9/3071; B30B 9/3082; B08B 1/16; B08B 1/165; B08B 9/0808; B08B 9/083; B08B 9/38
See application file for complete search history.

(56) References Cited

U.S. PATENT DOCUMENTS

| | | | |
|---|---|---|---|
| 2,609,024 A | 9/1952 | Russ | |
| 3,598,164 A | 8/1971 | August | |
| 5,366,208 A | 11/1994 | Benjamin | |
| 6,651,970 B2 | 11/2003 | Scott | |
| 7,637,154 B1 * | 12/2009 | Robbins | G01F 19/00 33/1 V |
| 8,220,789 B2 | 7/2012 | Pourounidis et al. | |
| 8,286,956 B2 | 10/2012 | Pearl et al. | |
| 8,590,877 B2 * | 11/2013 | Zeitlin | A47J 47/005 269/302.1 |
| 9,687,113 B2 | 6/2017 | Torlai et al. | |
| 2004/0119220 A1 * | 6/2004 | Davis | A47J 47/005 269/289 R |
| 2005/0217512 A1 * | 10/2005 | Ruddock | B30B 9/3053 100/247 |
| 2007/0080487 A1 | 4/2007 | Yartz | |
| 2010/0031481 A1 | 2/2010 | Lo | |

(Continued)

FOREIGN PATENT DOCUMENTS

| CN | 214631840 U | 11/2011 |
|---|---|---|
| CN | 109288420 A | 2/2019 |

(Continued)

OTHER PUBLICATIONS

International Search Report from PCT/US2023/026359 dated Dec. 11, 2023.

*Primary Examiner* — Tyrone V Hall, Jr.
(74) *Attorney, Agent, or Firm* — Dickinson Wright PLLC

(57) ABSTRACT

A cutting board assembly includes a basin that defines a compartment. A cutting board overlies the basin. The cutting board defines a scrap opening for dispensing scraps from the cutting board into the compartment of the basin. A scrap mover is positioned in the compartment of the basin and is moveable relative to the basin for moving scraps inside the compartment to provide additional space for more scraps.

18 Claims, 16 Drawing Sheets

(56) References Cited

U.S. PATENT DOCUMENTS

2010/0314814 A1 12/2010 Zeitlin
2011/0095465 A1 4/2011 Vlahos
2017/0014001 A1 1/2017 Lin

FOREIGN PATENT DOCUMENTS

| | | |
|---|---|---|
| CN | 211582793 | 9/2020 |
| CN | 212234240 U | 12/2020 |
| CN | 214180207 U | 9/2021 |
| DE | 9302016 U1 | 6/1994 |
| DE | 102006059484 B4 | 7/2010 |
| DE | 202011104167 U1 | 10/2011 |
| EP | 1932459 A2 | 6/2008 |
| GB | 1216434 | 3/2014 |
| KR | 940000277 Y1 | 1/1994 |
| KR | 960004076 Y1 | 5/1996 |
| KR | 102334035 B1 | 12/2021 |
| WO | 2007148134 A2 | 12/2007 |
| WO | 2013147624 A2 | 10/2013 |

\* cited by examiner

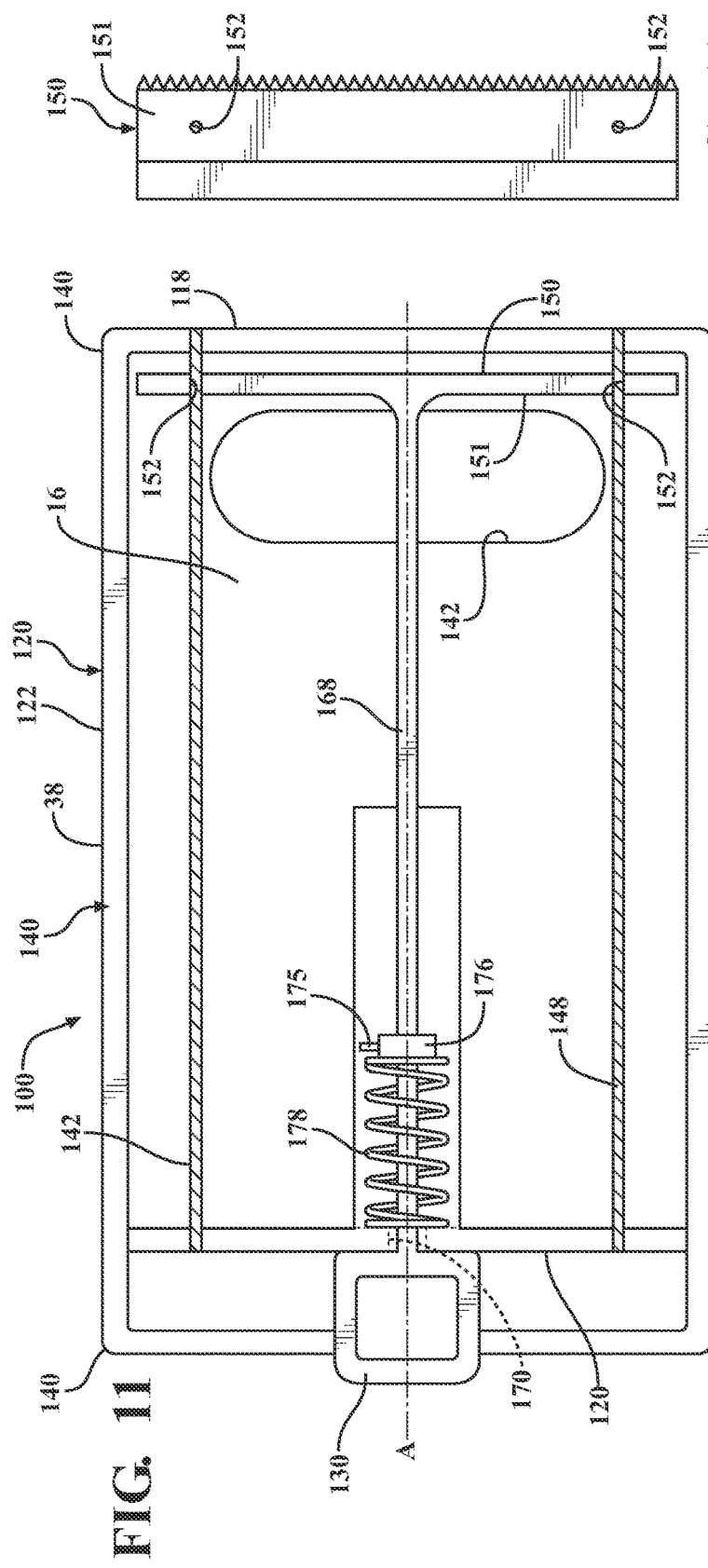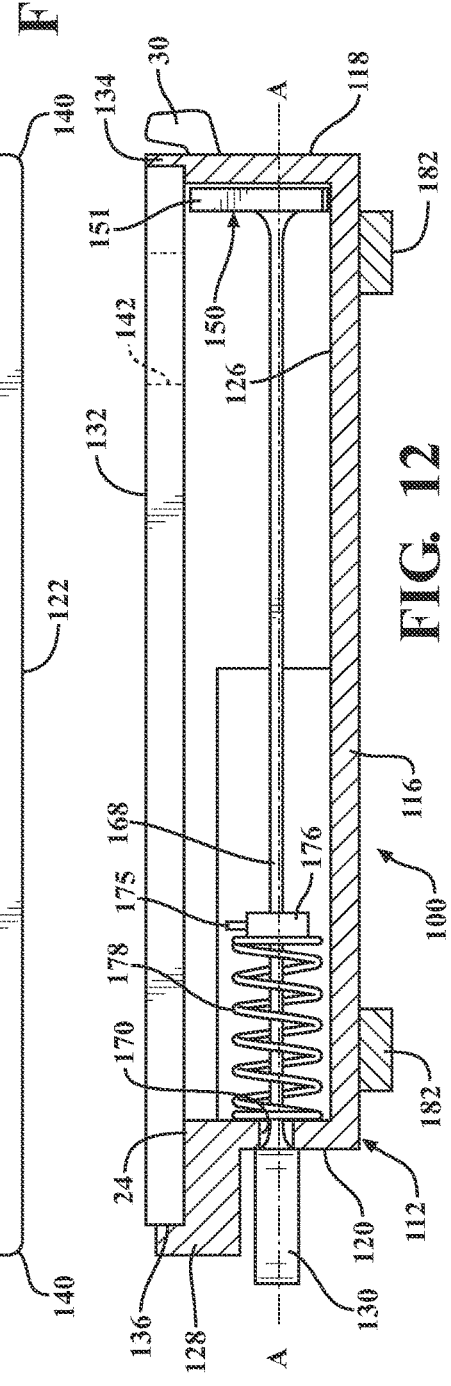

CUTTING BOARD ASSEMBLY WITH SCRAP MOVER

CROSS-REFERENCE TO RELATED APPLICATIONS

This application claims the benefit of U.S. Provisional Patent Application Ser. No. 63/454,269, filed on Mar. 23, 2023, the entire disclosure of which is hereby incorporated by reference in its entirety.

FIELD OF THE INVENTION

The present disclosure relates to the field of culinary arts. More particularly, the present disclosure relates to cutting board assemblies for preparing food.

BACKGROUND

Cutting boards are known in the culinary industry for use as a food preparation surface. An issue with conventional cutting boards is the food preparer must frequently clear the cutting board of scraps, which often includes halting a food preparation task to manually carry the cutting board to a waste receptacle. There remains a need for improvements to cutting boards.

SUMMARY OF THE INVENTION

According to an aspect of the disclosure, a cutting board assembly includes a basin that defines a compartment. A cutting board overlies the basin. The cutting board defines a scrap opening for dispensing scraps from the cutting board into the compartment of the basin. A scrap mover is positioned in the compartment of the basin and is moveable relative to the basin for moving scraps inside the compartment to provide additional space for more scraps.

The subject cutting board assembly provides a convenient manner for the food preparer to quickly remove scraps from the working surface of the cutting board by dispensing them through the scrap opening into the basin. The cutting board assembly also provides the ability to move the scraps within the compartment of the basin to provide additional space in the compartment for more scraps prior to disposing of the scraps in a waste receptacle. This provides a time saving benefit because more time can be spent preparing food between trips to the waste receptacle.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 11 is a bottom, cutaway view of a second embodiment of the cutting board assembly;

FIG. 12 is a side, cutaway view of the second embodiment of the cutting board assembly;

FIG. 13 is a front view of a scrap mover of the second embodiment of the cutting board assembly;

DESCRIPTION OF THE ENABLING EMBODIMENT

Example embodiments of a cutting board assembly 10, 100, 1000, 2000 embodying the teachings of the present disclosure will now be described more fully with reference to the accompanying drawings. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiments may be embodied in many different forms and that neither should be construed to limit the scope of the disclosure. Features of the embodiments may be combined with one another. In some example embodiments, well-known processes, well-known device structures, and well-known technologies are not described in detail.

Referring to the figures, wherein like numerals indicate corresponding parts throughout the several views, the cutting board assembly 10, 100, 1000, 2000 is shown. The cutting board assembly 10, 100, 1000, 2000 may be used in both commercial and residential settings and may have various sizes. Furthermore, the components of the cutting board assembly 10, 100, 1000, 2000 may be made of various materials depending on specific applications. For example, an at-home model of the cutting board assembly 10, 100, 1000, 2000 may primarily be made out of injection molded plastic while a commercial model may be made of more robust materials, e.g., metals and wood.

Figure 1:
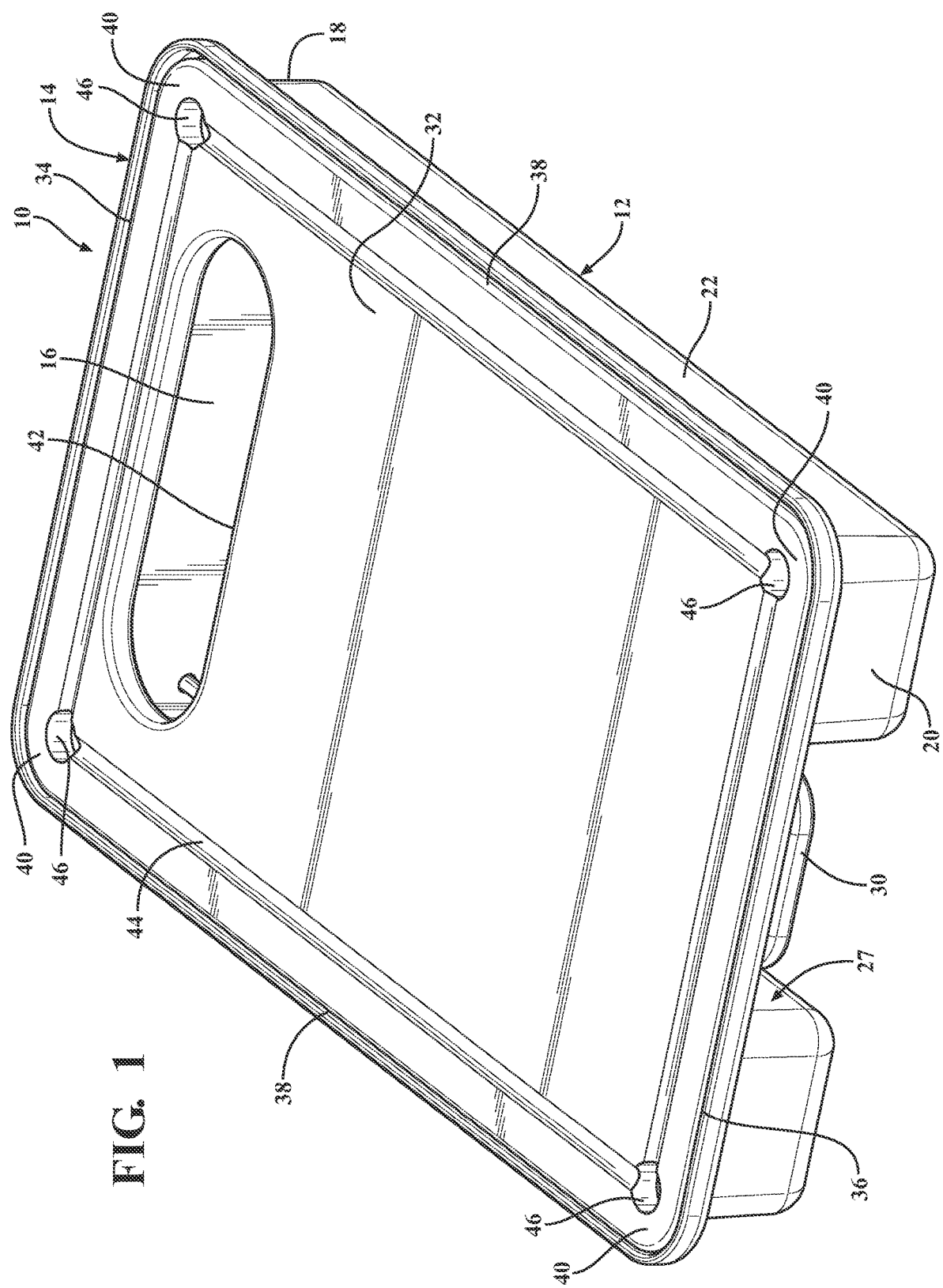
FIG. 1 is a top, perspective view of a first embodiment of a cutting board assembly.
Figure 2:
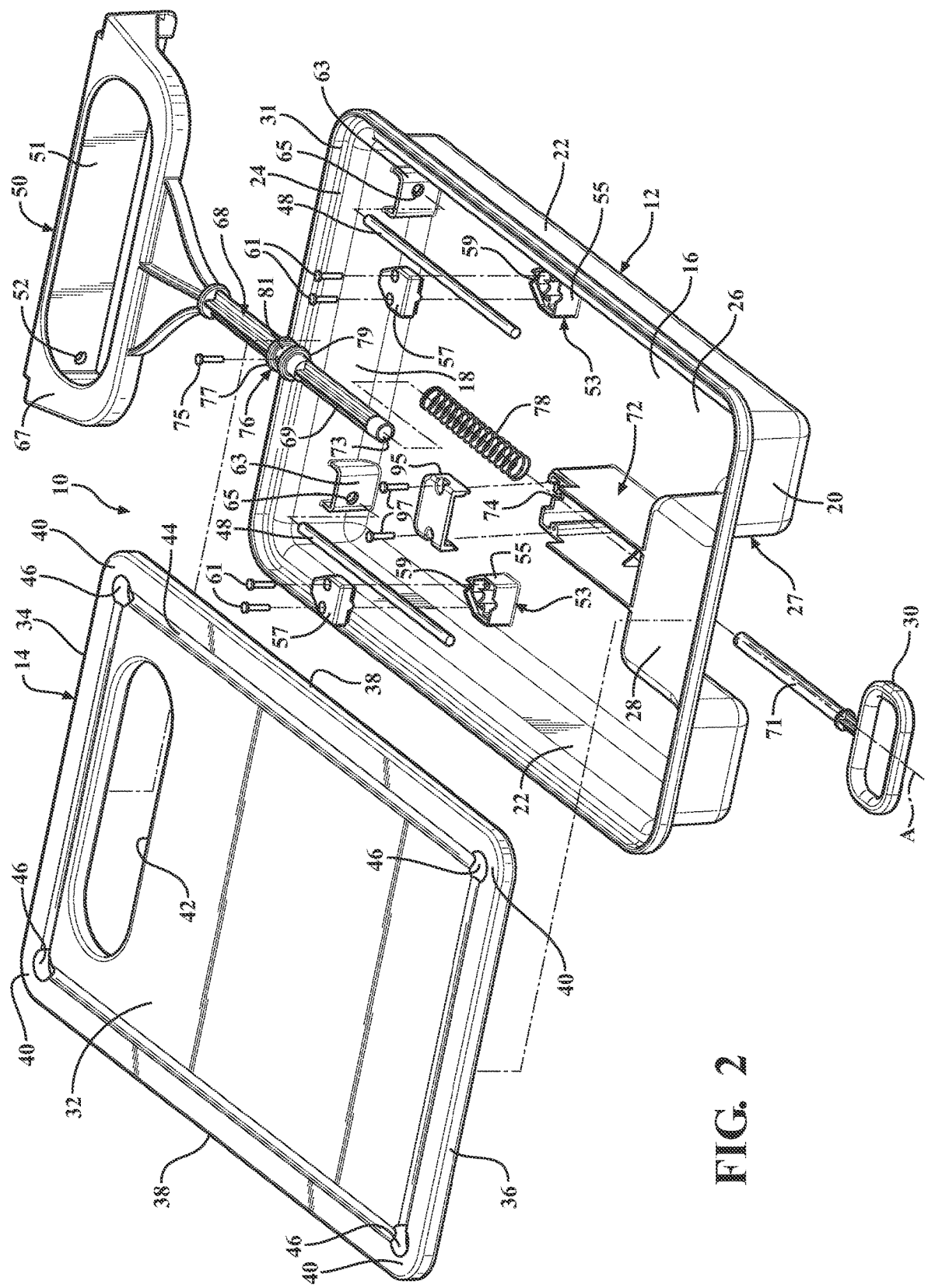
FIG. 2 is a top, perspective exploded view of the first embodiment of the cutting board assembly.

FIGS. 1-10 illustrate a first embodiment of the cutting board assembly 10. The cutting board assembly 10 includes a basin 12 that generally serves as a compartment for receiving scraps during an ingredient preparation activity on a cutting board 14 which is supported by the basin 12. As illustrated in FIG. 2, the basin 12 has a substantially planar bottom wall 16. According to the second preferred embodiment, the bottom wall 16 generally has a rectangular shape, but could have other shapes, e.g., an oval shape. A front wall 18 and a rear wall 20 extend upwardly from the bottom wall 16 in spaced and parallel relationship with one another at opposing ends of the bottom wall 16, and side walls 22 extend in spaced and parallel relationship with one another between the front and rear walls 18, 30. The front and rear walls 18, 20 are spaced from one another in a direction of a longitudinal axis A (shown in FIG. 2). The front, rear and side walls 18, 20, 22 collectively terminate in a vertical direction at a support surface 24 (best shown in FIGS. 2-3).

Figure 3:
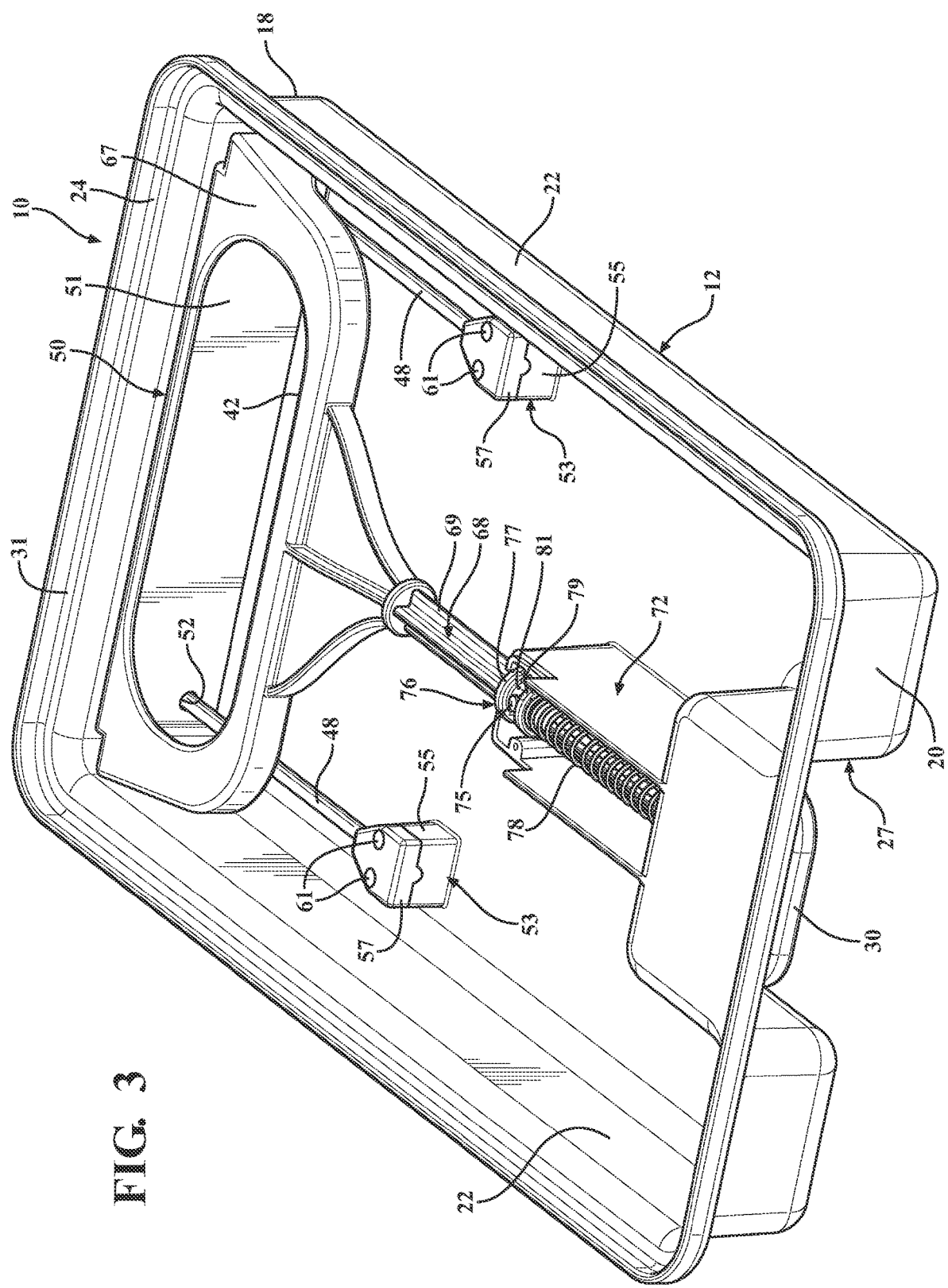
FIG. 3 is a top, perspective view of the first embodiment of the cutting board assembly, illustrating the cutting board assembly with a cutting board removed from a basin.

As best illustrated in FIGS. 2-3, the basin 12 further defines a compartment 26 between the bottom, front, rear and side walls 16, 18, 20, 22 for receiving scraps during the ingredient preparation activity.

The rear wall 20 defines a generally U-shaped recessed region 27 at a central portion of the rear wall 20 that extends toward the front wall 18 in the direction of the axis A. A flange 28 extends along a plane that is parallel to a plane of the bottom wall 16 over the recessed region 27. The flange 28 partially supports the cutting board 14 above a handle 30 (discussed below) for maximizing a working area of the cutting board 14.

Figure 4:
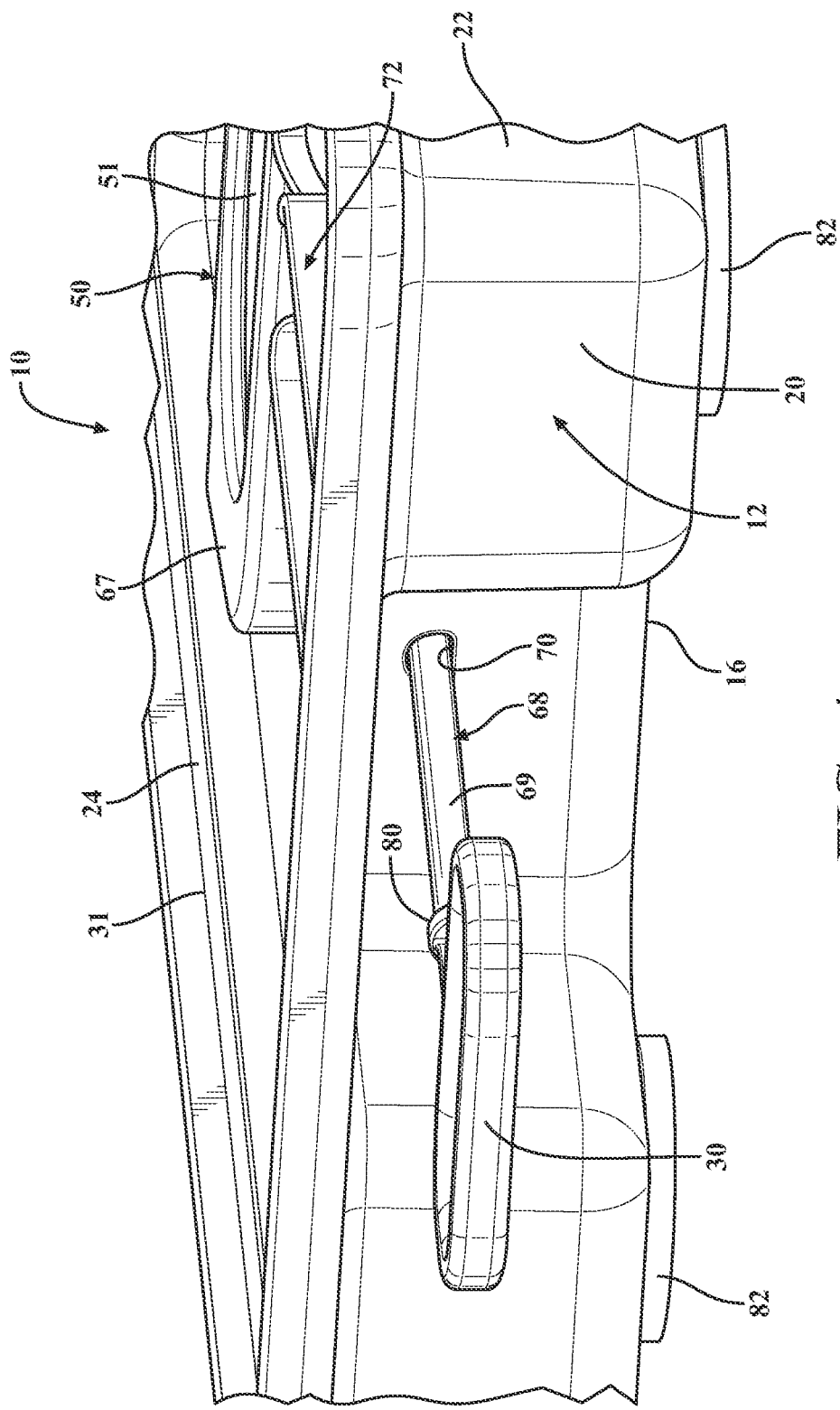
FIG. 4 is a rear perspective view of the first embodiment of the cutting board assembly, illustrating a handle.

As best shown in FIGS. 3-4, the basin 12 defines a rim 31 with an L-shaped cross-section at the support surface 24 at tops of the front, rear and side walls 18, 20, 22 for supporting and inhibiting movement of the cutting board 14 when the cutting board 14 is positioned on top of the basin 12. More particularly, the rim 31 extends around a perimeter of the cutting board 14 for preventing lateral movement of the cutting board 14. As shown, in the first preferred embodiment of the cutting board assembly 10, the rim 31 extends around an entire perimeter of the cutting board assembly 10, but could alternatively only be located at portions of the cutting board assembly 10, and could be broken into any number of segments.

Figure 5:
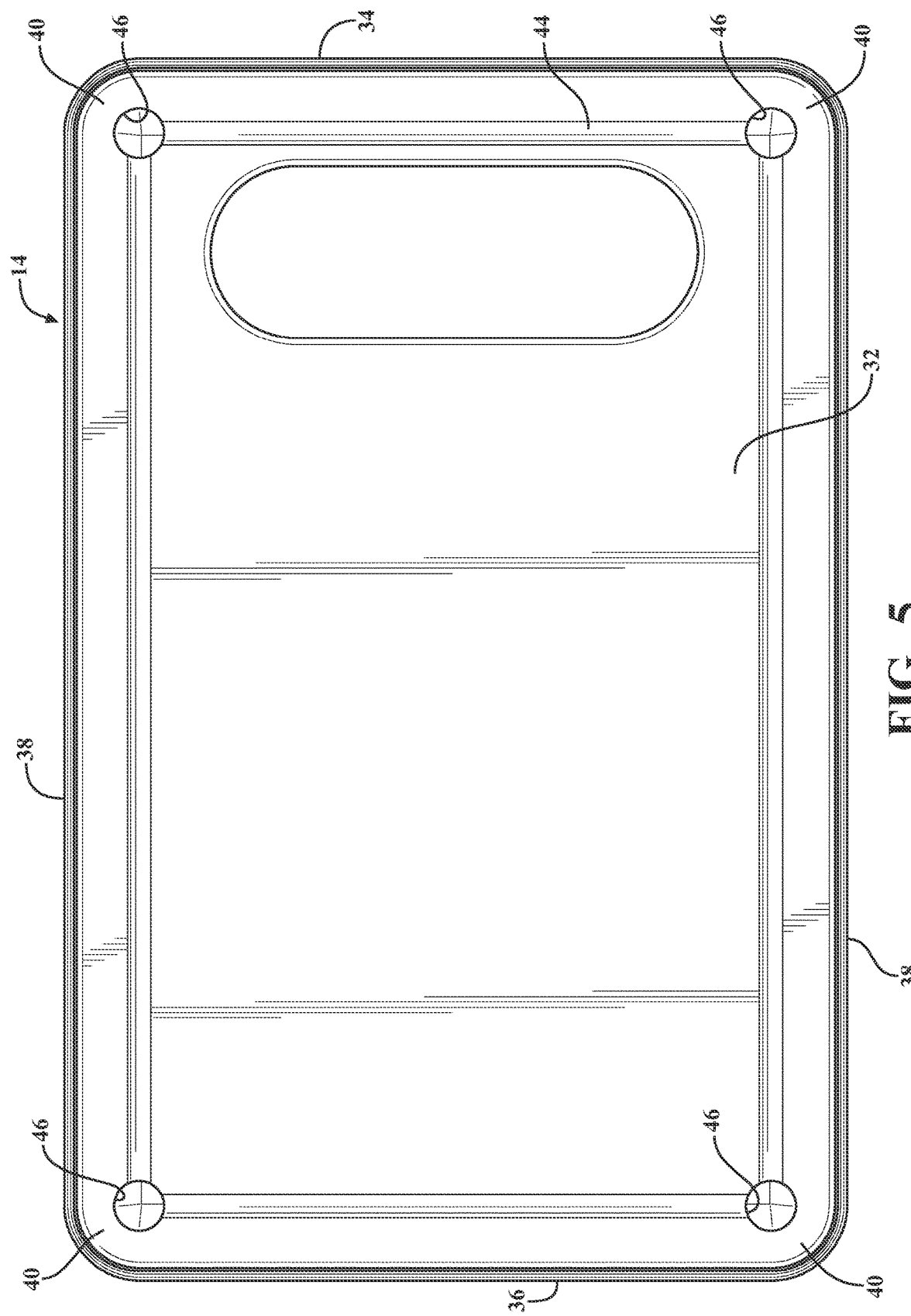
FIG. 5 is a top view of the cutting board of the first cutting board assembly.

As best shown in FIGS. 1-2 and 5, the cutting board 14 generally has a rectangular shape and has a top, cutting surface 32. The cutting board 14 also has a front edge 34 for overlying the front wall 18 of the basin 12, a rear edge 36 for overlying the flange 28 the basin 12, a pair of side edges 38 for overlying the side walls 22 of the basin 12, and four corners 40 between the edges 34, 36, 38.

The cutting board 14 also defines a scrap opening 42 for receiving scraps from the cutting board 14 into the compartment 26. According to the first preferred embodiment, the scrap opening 42 generally has an oval shape, is located adjacent to the front edge 34 of the cutting board 14, and spans a majority of a width of the cutting board 14 between the side edges 38. The scrap opening 42 could have other shapes, e.g., a circular or rectangular shape, it could have other sizes, and could be at other locations on the cutting board 14.

The top surface 32 of the cutting board 14 defines a channel 44 that follows a perimeter of the cutting board 14 for collecting liquids/juices from the cutting board 14. According to the first preferred embodiment, the channel 44 extends parallel to the front, rear and side edges 34, 36, 38 of the cutting board 14. According to other embodiments, the channel 44 could be located at other regions of the cutting board 14, could have other lengths and shapes, and could be comprised of any number of individual segments.

Four drain holes 46 extend through the cutting board 14, each in alignment with the channel 44 and each located adjacent to a corner of the cutting board 14. The drain holes 46 are configured to pass liquids that have accumulated in the channel 44 into the compartment 26 of the basin 12. Although the first preferred embodiment has four drain holes 36 arranged in the corners, other embodiments could include any number of drain holes 46 of various sizes and at various locations on the cutting board 14.

As best shown in FIGS. 2-3, a pair of guiding rods 48 are located in the compartment 26 and extend from the front wall 18 toward the rear wall 20 in spaced and parallel relationship with one another and parallel with the side walls 22 of the basin 12. Although the first preferred embodiment includes two guiding rods 48, other embodiments could include more, or only a single guiding rod 48 at various locations. The guiding rods 12 are made of metal in the preferred embodiments, but could be made of other materials.

A scrap mover 50 is disposed in the compartment 26 and is moveable along a longitudinal axis A between the front and rear walls 18, 20 of the basin 12 in order to move/compress scraps that have been deposited through the scrap opening 42 in order to accommodate the introduction of more scraps into the compartment 26, thus maximizing a working volume of the compartment 26. More particularly, the scrap mover 50 may generally have the shape of a squeegee, as is shown in the first preferred embodiment of the cutting board assembly 10. The scrap mover 50 includes a scraping member 51 that is configured to engage the bottom wall 16 of the basin 12 such that the scraping member 51 moves scraps that have settled against the bottom wall 16. According to the preferred embodiment, the scraping member 51 has a generally rectangular shape, extends parallel with the front wall 18 of the basin 12, and spans a distance between the side walls 22 of the basin 12. The scraping member 51 defines a pair of rod openings 52 that each receive one of the guiding rods 48 such that the scraping member 51 is guided along the guiding rods 48 in the direction of the longitudinal axis A during movement without pivoting or moving vertically or laterally.

As best shown in FIGS. 2-3, the guiding rods 48 only span approximately half a longitudinal length of the basin 12. More particular, a pair of central mounts 53 each extend from the bottom wall 14 of the basin 12 at a central location of the basin 12 in the direction of the longitudinal axis A. The central mounts 49 are spaced from one another in the width direction between the sidewalls 22. The central mounts 49 are each comprised of a lower component 55, and an upper component 57 stacked on top of the lower component 55 and with a rod channel 59 defined between the lower and upper components for receiving one of the guiding rods 48. A pair of fasteners 61 extend into upper and lower components 57, 55 to secure the upper and lower components 57, 55 to one another. During use, the central mounts 49 may limit movement of the scrap mover 50 via engagement of the scraping member 51 engaging the central mounts 49.

A pair of front mounts 63 extend from the bottom and front walls 14, 18 of the basin 12, each in alignment with one of the central mounts 53. Each of the central mounts 53 defines an orifice 65 for receiving one of the guiding rods 48. Each of the guiding rods 48 extends between one of the central mounts 53 and one of the front mounts 63 such that the central and front mounts 53, 63 support the guiding rods 48.

As best shown in FIGS. 2-3 and 7-8, the scrap mover 50 also includes a U-shaped support member 67 that extends from the scraping member 51 in the direction of the longitudinal axis A and is connected to an actuating rod 68 to reinforce the scrap mover 50. As best shown in FIG. 4, the actuating rod 68 extends through a central opening 70 of the rear wall 20 of the basin 12. The actuating rod 68 is configured to axially move the scrap mover 50. The actuating rod 68 terminates at the handle 30 outside of the basin 12 under the flange 28 to permit the user to move the actuating rod 68 and the scrap mover 50 in the axial direction. More particularly, the actuating rod 68 includes a first segment 69 that is connected to the support member 67 and a second segment 71 that is connected to the handle 30. The second segment 71 is received by a central bore 73 of the first segment 69. A connector 75 fixedly connects the first and second segments 69, 71. The connector 75 is removable to permit the first and second segments 69, 71 to be disconnected from one another. As shown in FIG. 1, in a stored position of the handle 30 in which the scraping member 51 is located adjacent to the front wall 18, the handle 30 is located in the recess 27 of the basin 12. This contains the handle 30 to reduce a likelihood of damaging the handle 30 during handling of the cutting board assembly 10.

A spring container 72 extends upwardly from the bottom wall 16 of the basin 12 and engages the rear wall 20 at the region of the recessed region 27 of the rear wall 20. The actuating rod 68 is received by a notch 74 at a top of the spring container 72. A portion of the notch 74 has cross-section which matches that of the actuating rod 68 to inhibit rotational movement of the actuating rod 68 during linear movement of the actuating rod. A cap 95 is located above the spring container 72 for holding the actuating rod 68 in place in the vertical direction. Like the notch 74 of the spring container 72, the cap 95 defines a notch that also has the same cross-sectional shape as the actuating rod 68 to further inhibit rotational movement of the rod 68 during linear movement of the actuating rod 68. According to the preferred embodiment, together the notches 74 of the cap 95 and spring container 72 have a plus sign shaped cross-section which match a plus sign shaped cross-section of the actuating rod 68. A pair of fasteners 97 secure the cap 95 to the spring container 72. According to the preferred embodiment, the fasteners 97 are bolts but other suitable fasteners could be used. As best shown in FIG. 3, a spring stopper 76 is disposed about, and fixed to the first segment 69 of the actuating rod 70 in the spring container 72.

The spring stopper 78 has a first component 77 and a second component 79 that is spaced axially from the first component 77 along a cylindrical portion 81. The first component 77 is configured to engage the spring container 72. The connector 75 extends through the cylindrical portion 81. A spring 78 is located in the spring container 72 about the actuating rod 68 and extends between the rear wall 20 and the second component 79 of the spring stopper 76. The spring 78 biases the scrap mover 50 in the direction of the longitudinal axis A toward the front wall 18. According to an embodiment, the spring stopper 78 may be linearly moveable along the actuating rod 68 to adjust a range of movement of the scrap mover 50.

As best shown in FIG. 4, a stopper 80 is positioned along the actuating rod 35 outside of the spring container 72 for limiting movement of the scrap mover 50 in the direction of the axis A toward the front wall 18 in response to engagement of the stopper 80 against the rear wall 20.

Figure 6:
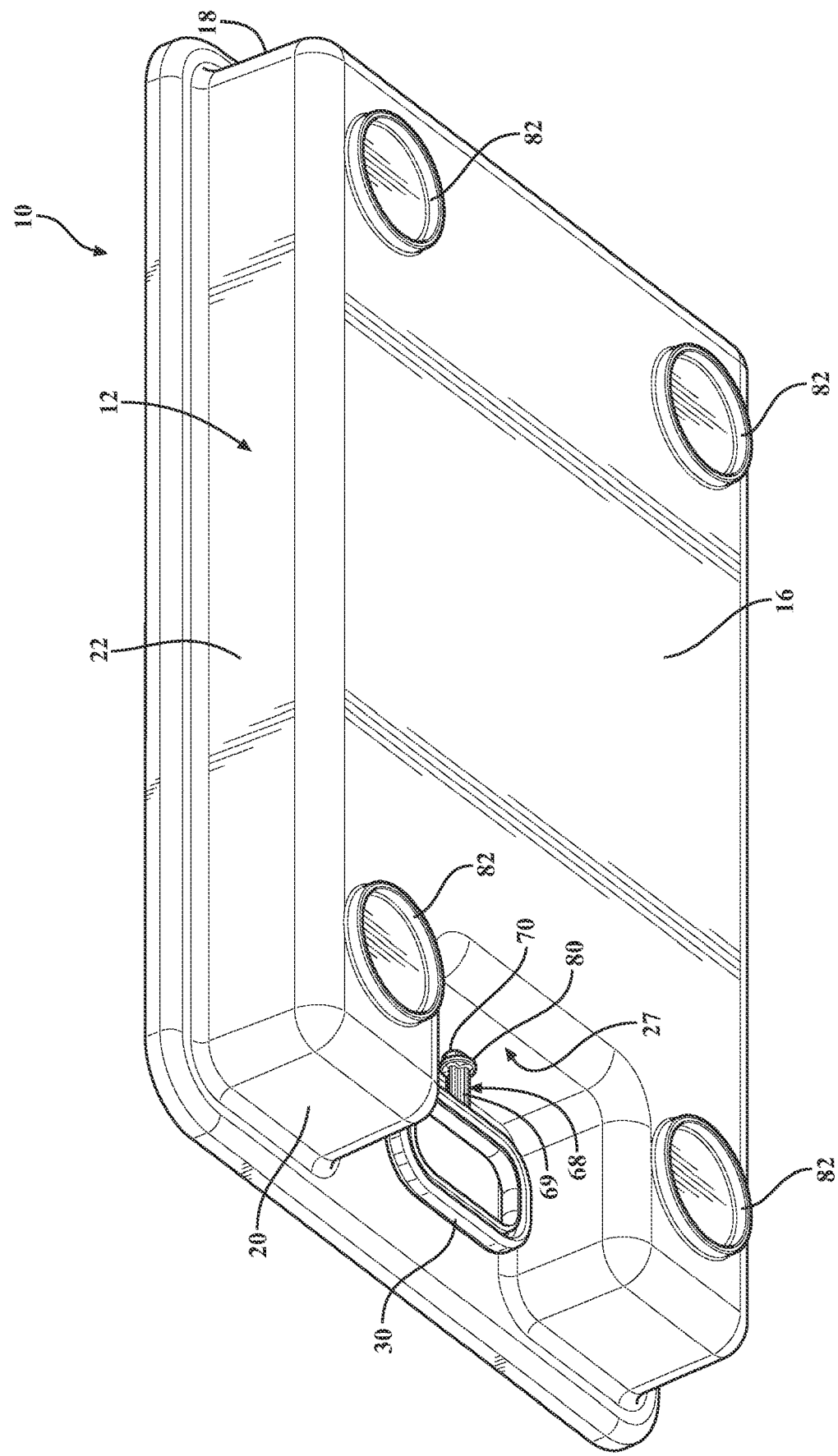
FIG. 6 is a bottom, perspective view of the first embodiment of the cutting board assembly.
Figure 7:
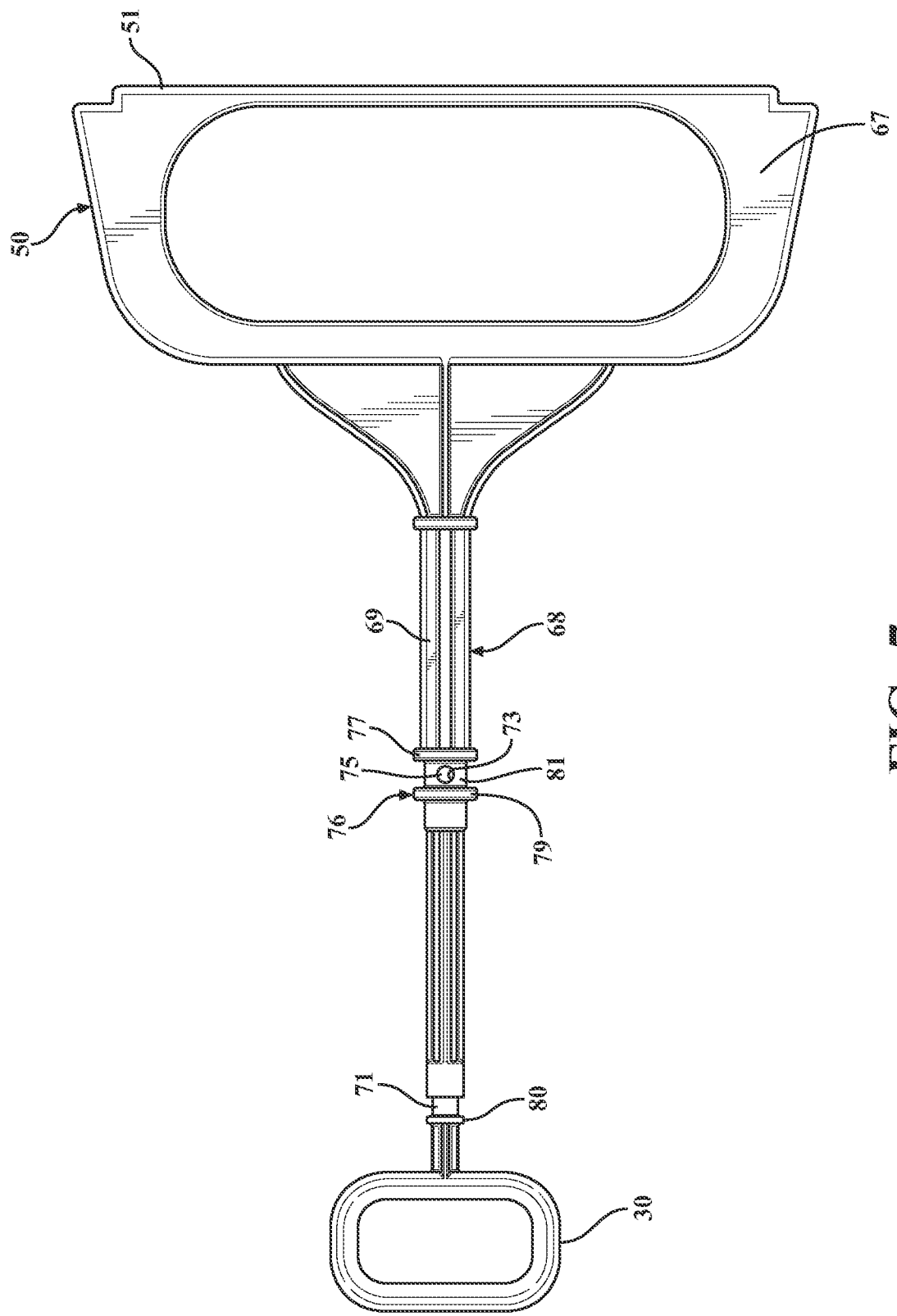
FIG. 7 is a top view of a scrap mover of the first embodiment of the cutting board assembly.
Figure 8:
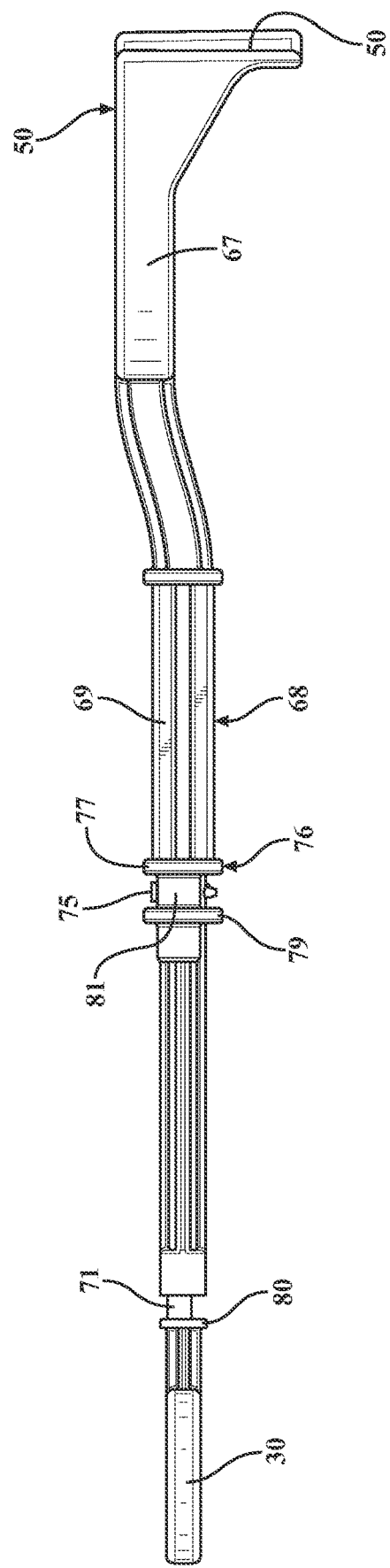
FIG. 8 is a side view of the scrap mover of the first embodiment of the cutting board assembly.
Figure 9:
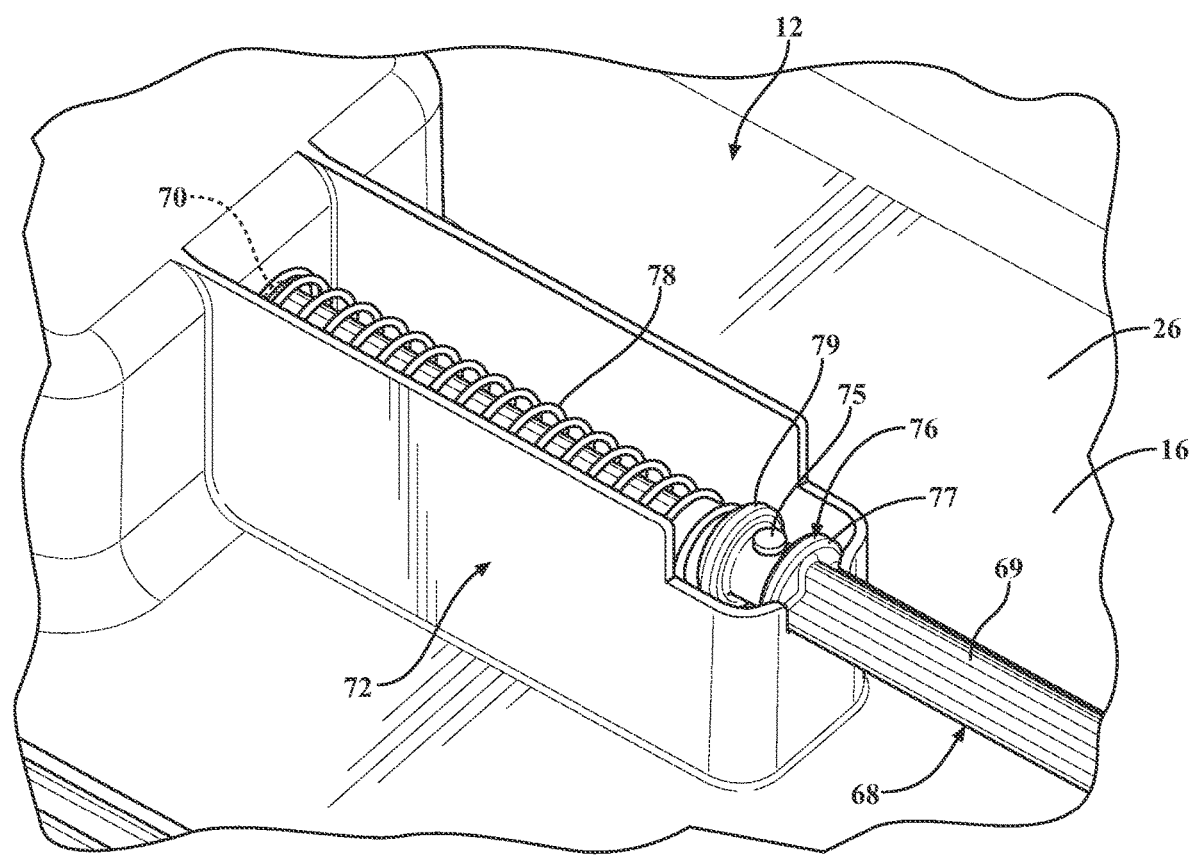
FIG. 9 is a top perspective view of a spring container and associated components of the first embodiment of the cutting board assembly.
Figure 10:
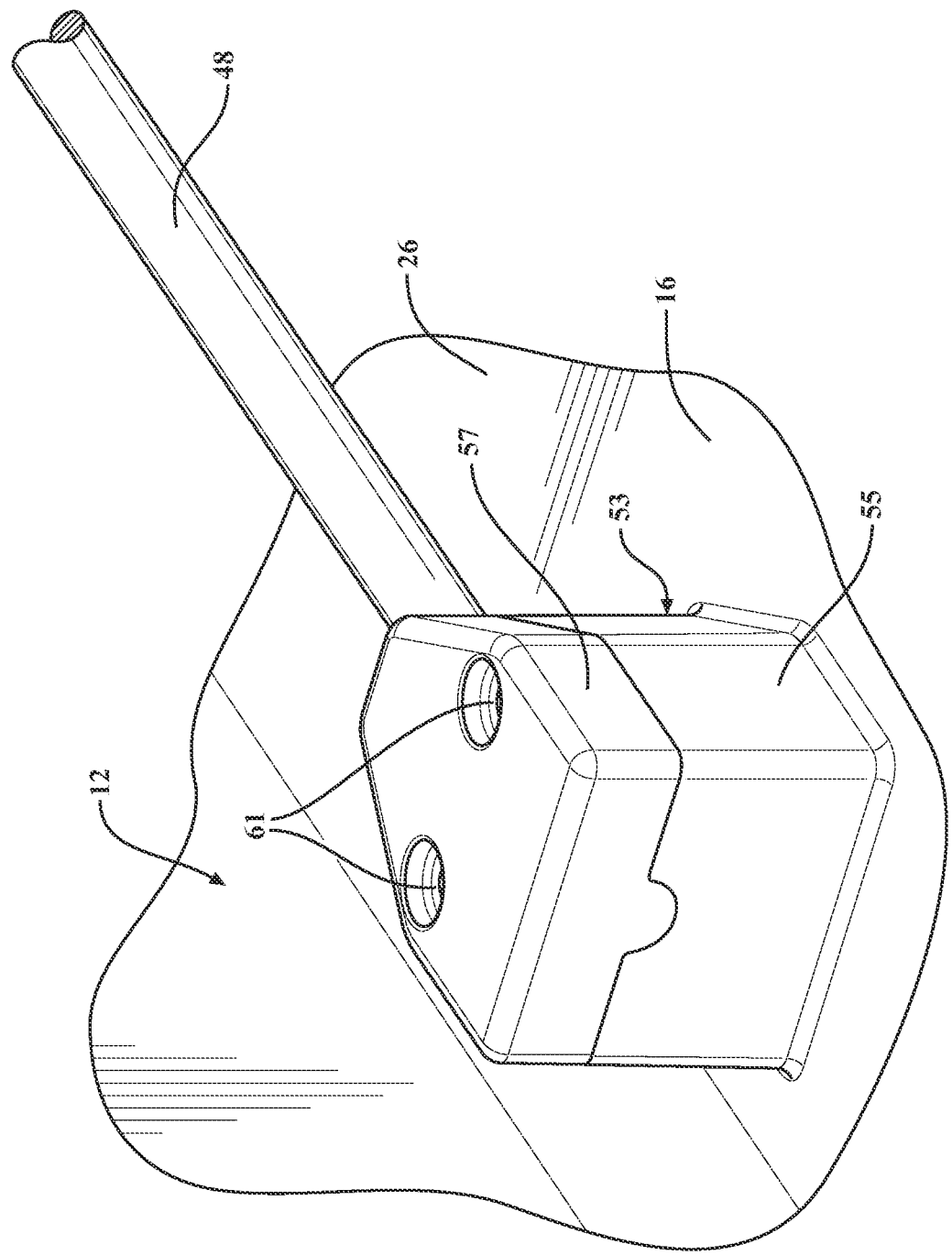
FIG. 10 is a rear, perspective view of a central mount of the first embodiment of the cutting board assembly.
Figure 14:
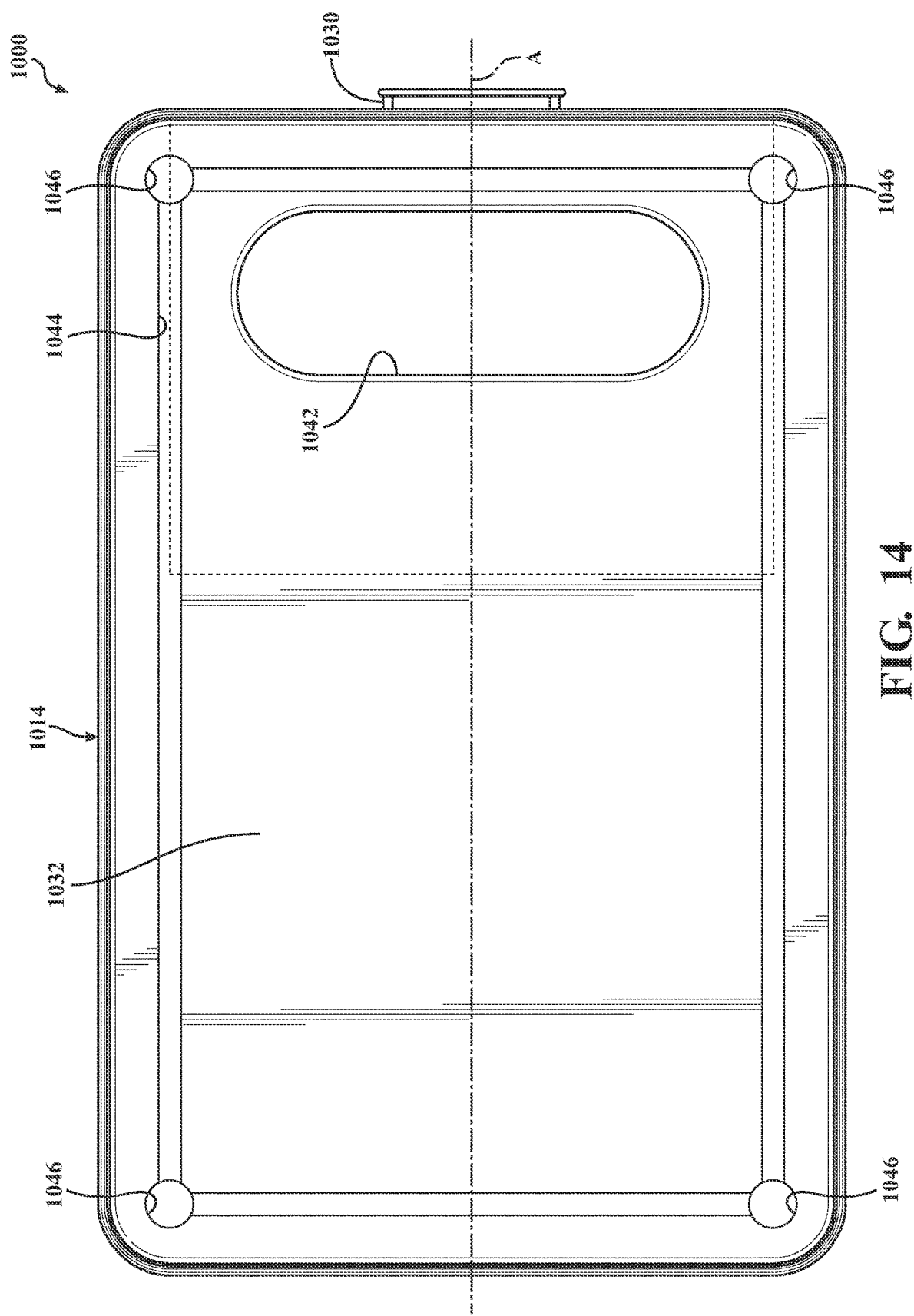
FIG. 14 is a top view of a third embodiment of the cutting board assembly, illustrating a removable tray in the compartment.
Figure 15:
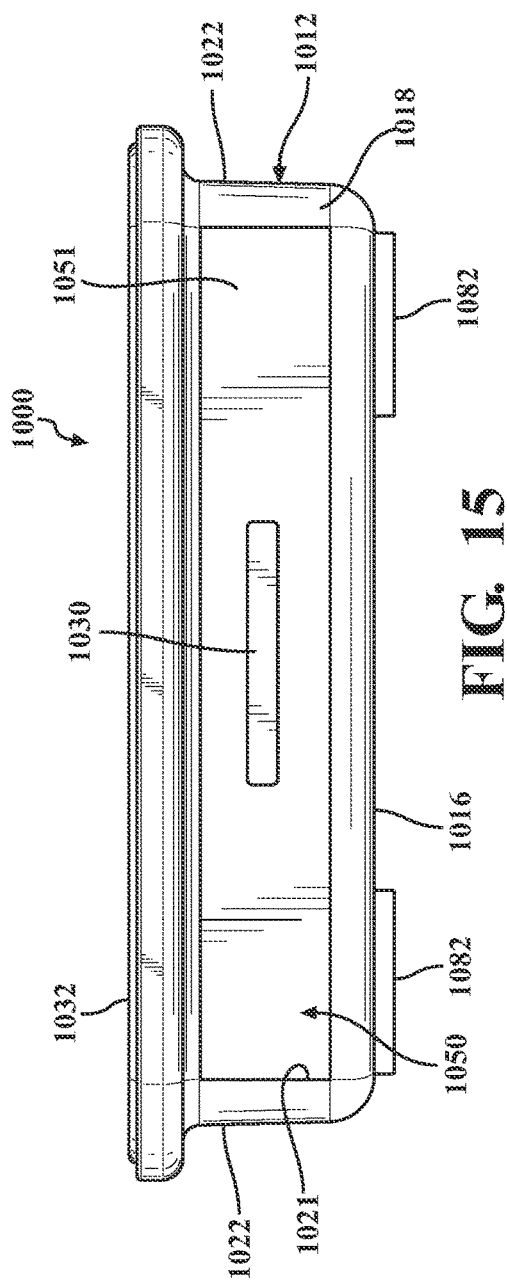
FIG. 15 is a front view of the third embodiment of the cutting board assembly.
Figure 16:
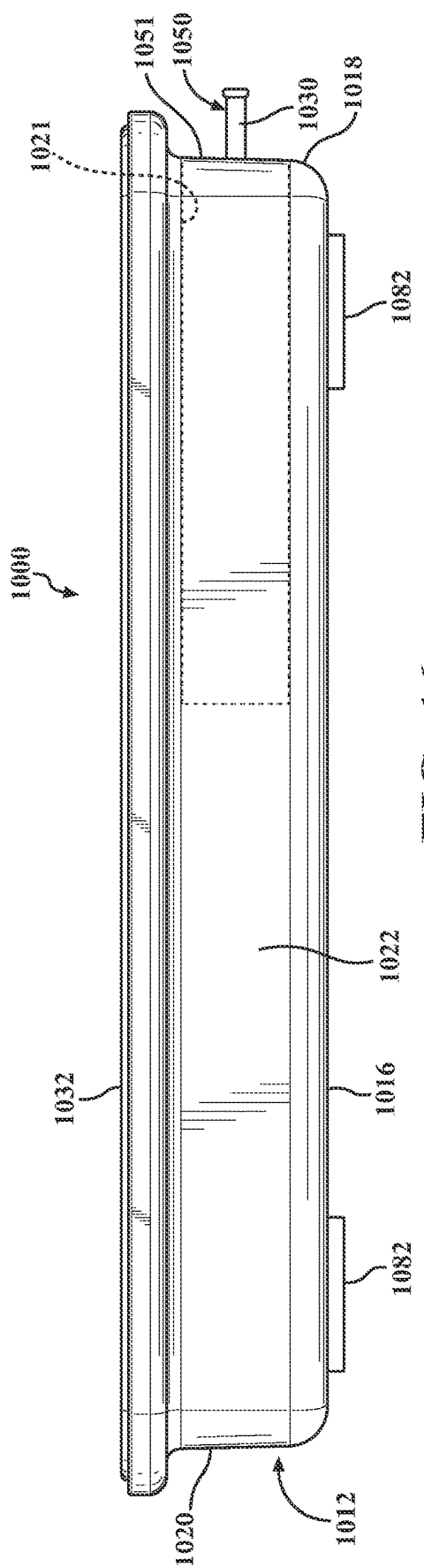
FIG. 16 is a right side view of the third embodiment of the cutting board assembly.
Figure 17:
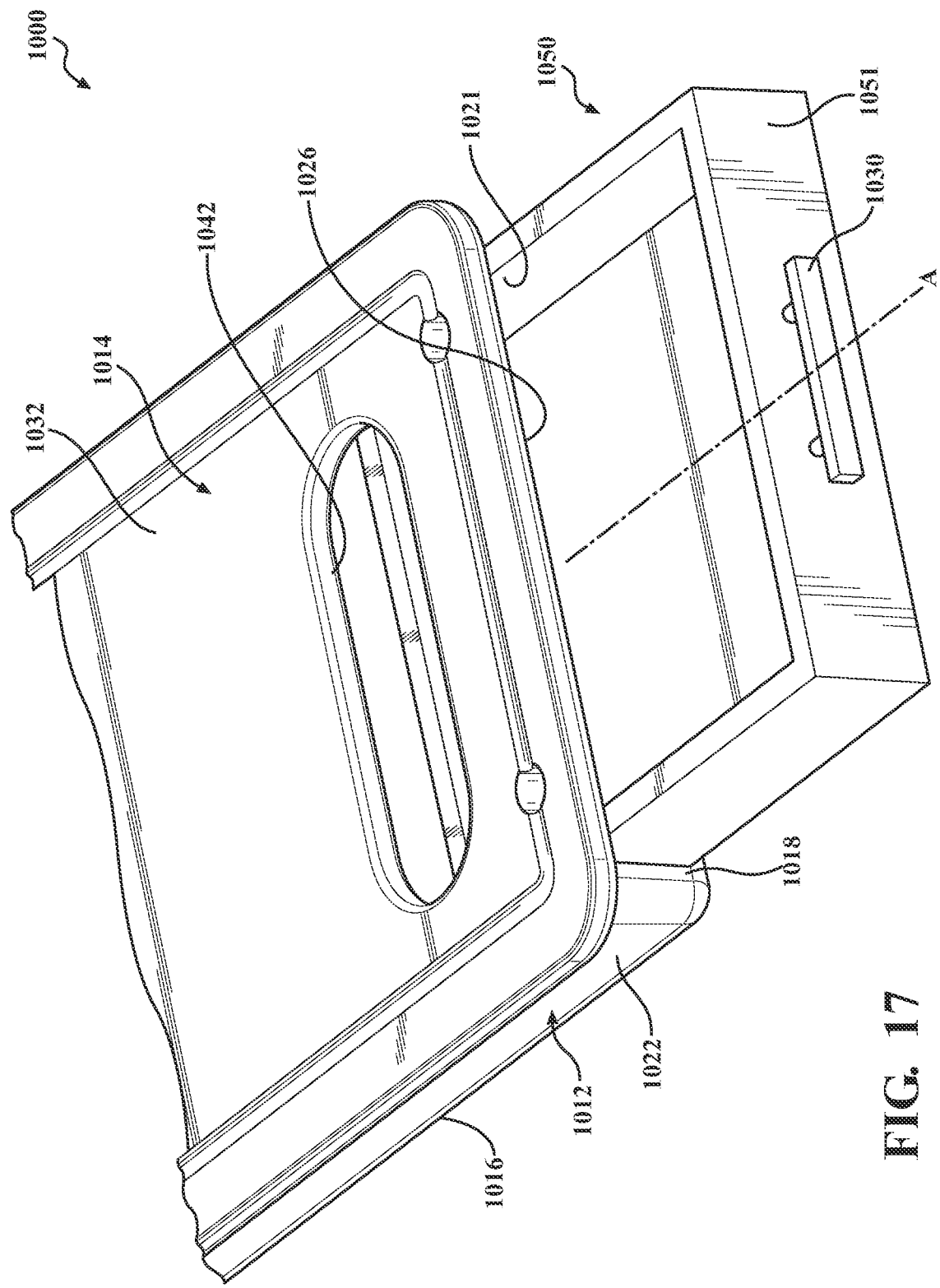
FIG. 17 is a perspective view of the third embodiment of the cutting board assembly.

As best shown in FIGS. 4 and 6, a plurality of movement inhibitors 82 extend from a bottom surface of the bottom wall 16. The movement inhibitors 82 are constructed of a high friction material such as rubber for inhibiting movement of the cutting board assembly 10 along a surface upon which it is placed. The first preferred embodiment includes four movement inhibiters 68, each configured as a leg 68 located at a corner of the basin 12, but other numbers of movement inhibitors 82 could be used at different locations. For example, the movement inhibitor could be configured as a single mat that spans across substantially the entire bottom surface of the basin 12.

FIGS. 11-13 illustrate a second preferred embodiment of the cutting board assembly 100. The second embodiment is similar to the first embodiment with certain differences. First, the guiding rods 148 span an entire distance between the front and rear walls 118, 120, rather than spanning half of the length like the first embodiment.

Furthermore, rear wall 120 extends continuously along a plane rather than including a recessed region 27. A flange 128 extends beyond the rear wall 120 along an entire width of the rear wall 120.

Additionally, this arrangement does not include a spring container 72. Movement of the scrap mover 50 is limited by compression of the spring 178 and a spring stopper 176 which may be adjustably be positioned along different lengths of the actuator rod 168.

FIGS. 14-17 illustrate a third embodiment of the cutting board assembly 1000. This arrangement is similar to the previously described embodiment, but the scrap mover 1050 is configured as a tray 1050 which is moveable into and out of the compartment 1026 of the basin 1012. More particularly, the front wall 1018 of the basin 1012 defines an opening 1021 into the compartment 1026 which receives the tray 1050. As shown, the tray 1050 is configured to underlie the scrap opening 1042 of the cutting board 1014 such that food scraps are collected in the tray 1050. The tray 1050 is axially moveable between a closed position in which it is entirely contained in the compartment 1026 (e.g., FIGS. 14-16), and an open position in which the tray 1050 is mostly or entirely removed from the compartment 1026 (e.g., FIG. 17). The tray 1050 has a tray face 1051 which is configured to be flush with the front wall 1018 of the basin 1012 when the tray 1050 is in the closed position (shown in FIGS. 14-16). A handle 1030 protrudes from the tray face 1051 to facilitate movement of the tray 1050. During use, after food scraps have accumulated in the tray 1050, the tray 1050 may be removed from the basin 1012 to permit the user to dispose of the scraps.

Figure 18:
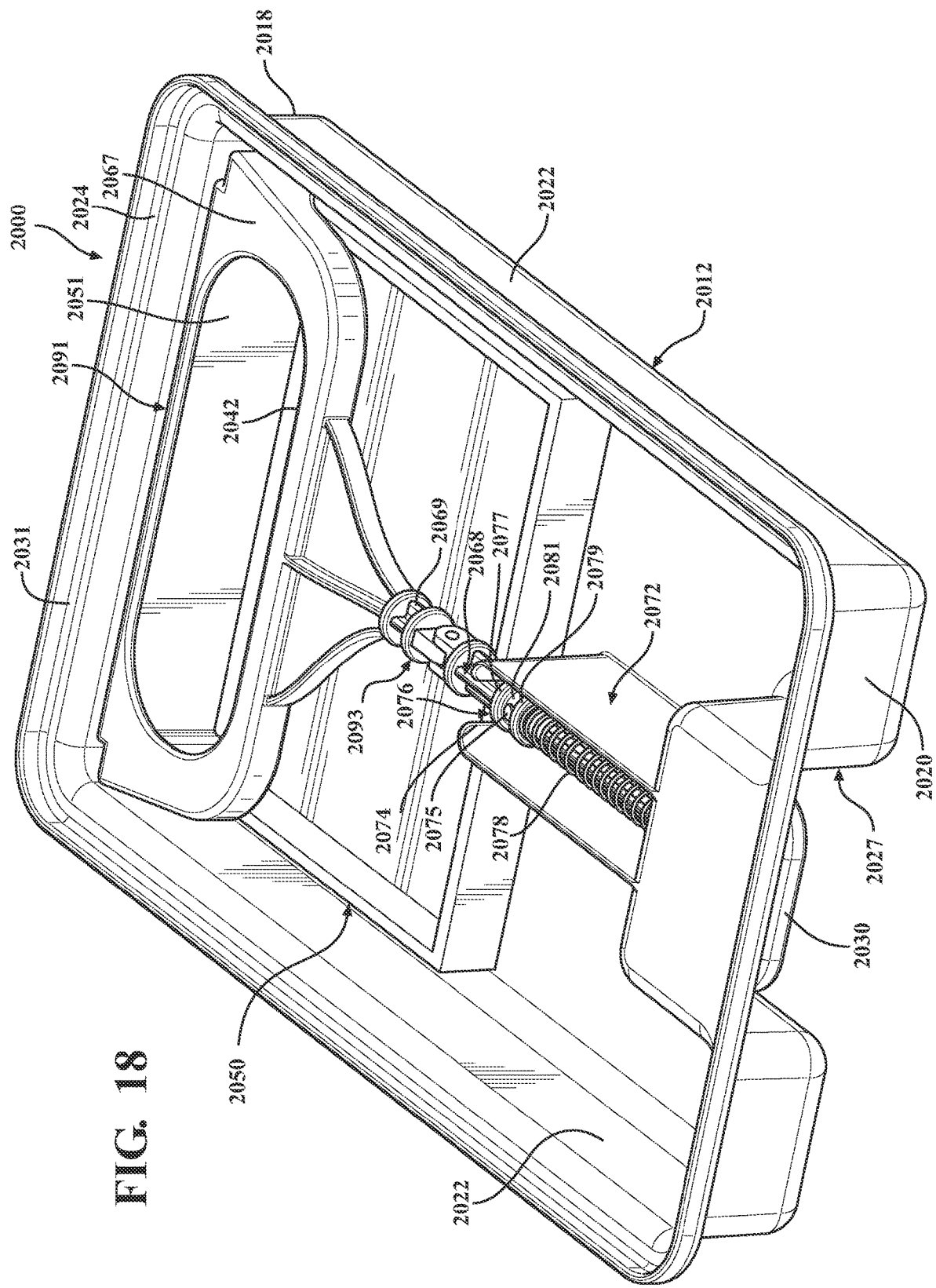
FIG. 18 is a perspective view of a fourth embodiment of the cutting board assembly, illustrating a supplementary scrap mover configured as a squeegee positioned in a first scrap mover configured as a tray.
Figure 19:
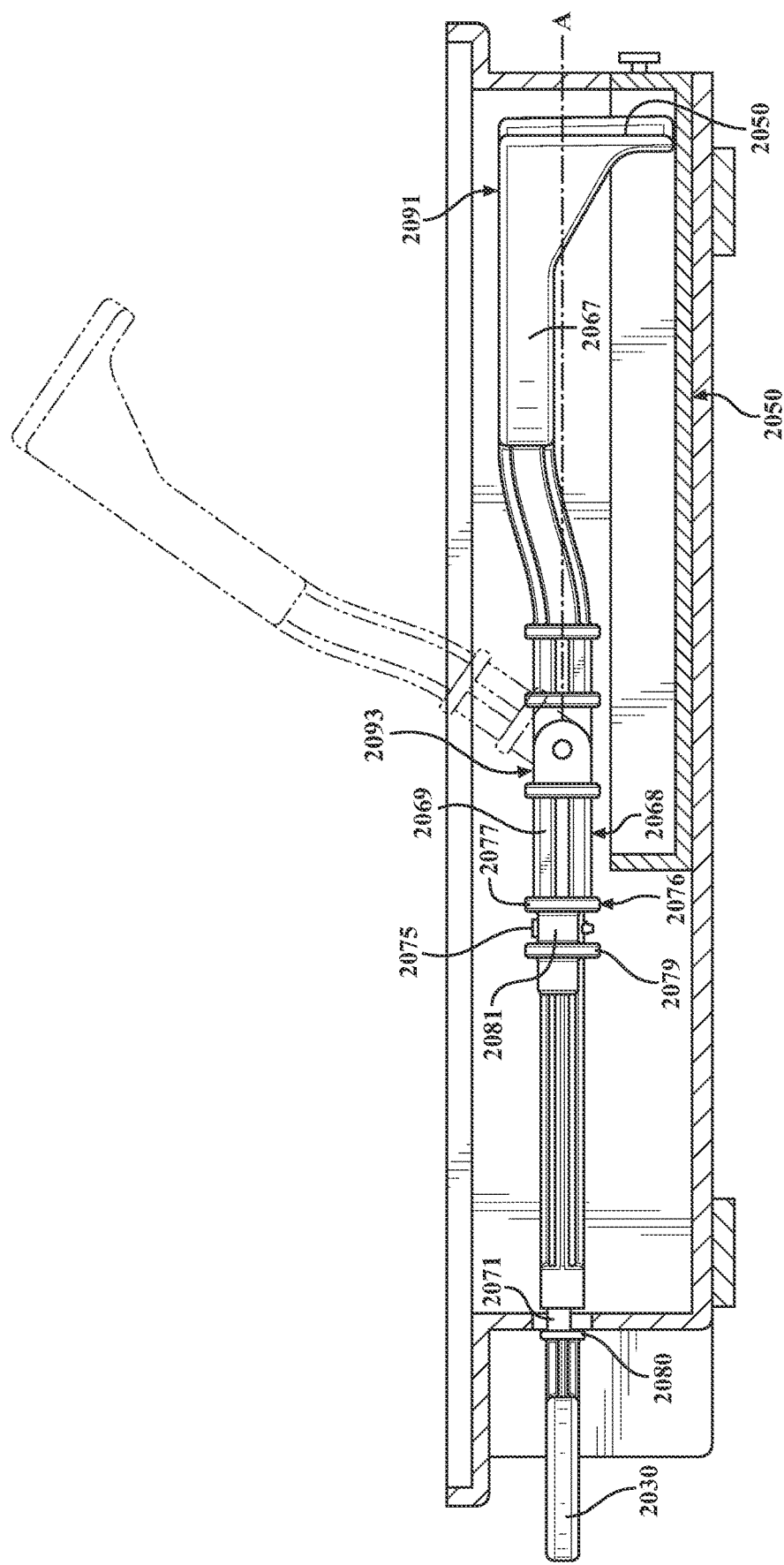
FIG. 19 is a side view of the fourth embodiment, illustrating pivoting of the squeegee to permit the tray to be removed from the basin.

FIGS. 18-19 illustrate a fourth embodiment of the cutting board assembly 2000. This embodiment includes a first scrap mover 2050 configured as a tray 2050, similar to the tray 1050 of the third embodiment, as well as a supplementary scrap mover 2091 configured as a squeegee 2091 similar to the first scrap mover 50, 150 of the first and second embodiments. The squeegee 2091 is linearly moveable within the tray 2050 along the axis A in order to compact scraps that have accumulated inside the tray 2050. Once the tray 2050 has filled with scraps to a predetermined extent, the tray 2050 may be removed to allow the user to discard the scraps. The squeegee 2091 has a hinge 2093 along its actuating rod 2068 to permit the scraping member 2051 of the squeegee 2091 to be pivoted upwardly away from the tray 2050 to provide space for the tray 2050 to be removed from the basin (pivoting movement shown in broken lines in FIG. 19). As shown, the tray 2050 is positioned below the actuating rod 2068 to permit movement of the squeegee 2091 relative to the tray 2050 during use. According to this embodiment, the notch 2074 of the spring container 2072 has a cross-sectional shape which permits the entire actuating rod 2068, including the components of the 2093 to pass into the spring container to provide movement of the squeegee 2091.

One or more blocking features may be provided to limit a range of movement of the tray 2050 inside the basin 2012.

It should be appreciated that the length of the actuating rod and/or spring container may be adjusted in any of the arrangements to further adjust the range of linear movement of the squeegee.

Clearly, changes may be made to what is described and illustrated herein without, however, departing from the scope defined in the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in other embodiments, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A cutting board assembly, comprising:
  a basin extending between a front wall and a rear wall along a longitudinal axis and having a bottom wall and defining a compartment;
  a cutting board overlying the basin, the cutting board defining a scrap opening for dispensing scraps from the cutting board into the compartment of the basin;
  at least one scrap mover positioned in the compartment of the basin and moveable along the bottom wall in the direction of the longitudinal axis relative to the basin for moving scraps inside the compartment to provide additional space for more scraps, and having a rod protruding through the rear wall of the basin to permit a user to move the scrap mover.

2. The cutting board assembly as set forth in claim 1, wherein the at least one scrap mover includes a scraping member connected to the rod and configured to engage the bottom wall of the basin for pushing the scraps in the basin.

3. The cutting board assembly as set forth in claim 2, wherein the basin further has a pair of side walls that extend axially between the front and rear walls, and wherein the scraping member spans substantially an entire distance between the side walls and is moveable in the axial direction of the longitudinal axis.

4. The cutting board assembly as set forth in claim 3, wherein the scraping member extends along a plane being substantially perpendicularly to the bottom wall.

5. The cutting board assembly as set forth in claim 4, wherein the scraping member has a rectangular shape.

6. The cutting board assembly as set forth in claim 1, wherein the cutting board defines a channel adjacent to a perimeter of the cutting board for gathering drippings from the cutting board.

7. The cutting board assembly as set forth in claim 6, wherein the cutting board defines at least one drain hole in alignment with the channel for depositing the drippings that have accumulated in the channel into the basin.

8. A cutting board assembly, comprising:
  a basin extending between a front wall and a rear wall along a longitudinal axis and having a bottom wall and defining a compartment;
  a cutting board overlying the basin, the cutting board defining a scrap opening for dispensing scraps from the cutting board into the compartment of the basin;
  at least one scrap mover positioned in the compartment of the basin and moveable in the direction of the longitudinal axis relative to the basin and having a scraping member engaging the bottom wall for moving scraps inside the compartment to provide additional space for more scraps at least one guiding rod connected to the basin and extending in the direction of the longitudinal axis in the compartment and extending through the scraping member with the scraping member being slideable along the guiding rod for guiding axial movement of the scraping member in the compartment.

9. The cutting board assembly as set forth in claim 8, wherein the at least one guiding rod includes a pair of guiding rods positioned on opposing sides of the actuating rod.

10. The cutting board assembly as set forth in claim 8, wherein the at least one guiding rod extends between the front and rear walls of the basin.

11. The cutting board assembly as set forth in claim 8, wherein the at least one guiding rod extends approximately half of an axial length between the front and rear walls.

12. The cutting board assembly as set forth in claim 11, wherein at least one central mount is connected to the bottom wall of the basin and supports the at least one guiding rod.

13. The cutting board assembly as set forth in claim 8, wherein a biasing member biases the scraping member in a first direction.

14. The cutting board assembly as set forth in claim 13, wherein the biasing member is a spring disposed about the actuating rod.

15. The cutting board assembly as set forth in claim 14, further including a stopper positioned along the actuating rod for limiting movement of the scraping member.

16. The cutting board assembly as set forth in claim 15, wherein the spring extends between the stopper and the rear wall of the basin.

17. The cutting board assembly as set forth in claim 15, wherein the stopper is axially moveable along the actuating rod for adjusting an extent to which the scraping mover can move.

18. The cutting board assembly as set forth in claim 15 wherein a spring container extends upwardly from the bottom wall and is connected to the rear wall, the actuating rod extends through the spring container, the stopper is located in the spring container, and the spring extends between the rear wall and the stopper inside the spring container such that the spring biases the at least one scrap mover away from the rear wall.

\* \* \* \* \*